(12) United States Patent
Sellner et al.

(10) Patent No.: US 10,683,045 B2
(45) Date of Patent: *Jun. 16, 2020

(54) THROWABLE ROBOT WITH CLAMSHELL BODY

(71) Applicant: ReconRobotics, Inc., Edina, MN (US)

(72) Inventors: Matthew M. Sellner, San Jose, CA (US); Alex J. Kossett, Minnetonka, MN (US); Jade Moreau, San Francisco, CA (US); Andrew Drenner, Bloomington, MN (US); Steve Gigl, Crystal, MN (US)

(73) Assignee: ReconRobotics, Inc., Edina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,851

(22) Filed: Aug. 14, 2018

(65) Prior Publication Data

US 2019/0002045 A1    Jan. 3, 2019

Related U.S. Application Data

(63) Continuation of application No. 14/747,817, filed on Jun. 23, 2015, now Pat. No. 10,046,819.

(60) Provisional application No. 62/015,889, filed on Jun. 23, 2014.

(51) Int. Cl.
| | |
|---|---|
| *B60K 1/02* | (2006.01) |
| *B60K 1/04* | (2019.01) |
| *B60K 7/00* | (2006.01) |
| *B60K 17/04* | (2006.01) |
| *B62D 57/00* | (2006.01) |
| *B62D 57/02* | (2006.01) |
| *B62D 61/00* | (2006.01) |

(52) U.S. Cl.
CPC ............ *B62D 57/02* (2013.01); *B60K 1/02* (2013.01); *B60K 1/04* (2013.01); *B60K 7/0007* (2013.01); *B60K 17/043* (2013.01); *B62D 57/00* (2013.01); *B62D 57/022* (2013.01); *B62D 61/00* (2013.01); *B60K 2007/0046* (2013.01); *B60K 2007/0061* (2013.01)

(58) Field of Classification Search
CPC .... B62D 57/02; B62D 57/022; B62D 57/024; B62D 57/028; B62D 61/00; B60K 1/02; B60K 1/04; B60R 16/0231
See application file for complete search history.

(56) References Cited

U.S. PATENT DOCUMENTS

| | | | | | |
|---|---|---|---|---|---|
| 2,818,301 | A | * | 12/1957 | Hayden | B60C 27/045 301/46 |
| 4,061,199 | A | * | 12/1977 | Last | A61G 5/061 180/8.2 |
| D338,474 | S | * | 8/1993 | Christensen | D15/124 |

(Continued)

*Primary Examiner* — Joseph M Rocca
*Assistant Examiner* — Maurice L Williams
(74) *Attorney, Agent, or Firm* — Christensen, Fonder, Dardi & Herbert PLLC

(57) ABSTRACT

A two wheeled throwable robot comprises an elongate chassis with two ends, a motor at each end, drive wheels connected to the motors, and a tail extending from the elongate chassis. A rear portion having a deep recess securing the pair of motors with brackets, and batteries with brackets. The forward part having a shallow recess with a printed circuit board secured therein having control circuitry. The wheels are less than six inches in diameter and the robot weighs less than five pounds.

19 Claims, 6 Drawing Sheets

(56) References Cited

U.S. PATENT DOCUMENTS

| | | | |
|---|---|---|---|
| 5,487,692 A * | 1/1996 | Mowrer | A63H 17/262 440/92 |
| 5,871,386 A * | 2/1999 | Bart | A63H 15/06 446/443 |
| 6,502,657 B2 * | 1/2003 | Kerrebrock | B25J 9/08 180/218 |
| 6,824,508 B2 * | 11/2004 | Kim | A61B 1/00156 348/82 |
| 6,860,346 B2 * | 3/2005 | Burt | B60B 15/00 180/218 |
| 6,902,464 B1 * | 6/2005 | Lee | A63H 5/00 446/409 |
| D540,503 S * | 4/2007 | Tsang | D34/28 |
| 7,249,640 B2 * | 7/2007 | Horchler | B62D 57/022 180/7.1 |
| D584,366 S * | 1/2009 | Bowen | D21/563 |
| 7,559,385 B1 * | 7/2009 | Burt | B60K 7/0007 180/167 |
| 8,186,469 B2 * | 5/2012 | Yim | B25J 5/007 180/218 |
| 8,342,440 B2 * | 1/2013 | Papanikolopoulos | A63H 27/12 244/17.11 |
| 8,636,096 B2 * | 1/2014 | Kim | B25J 11/002 180/21 |
| 9,020,639 B2 * | 4/2015 | Bewley | B25J 5/005 700/258 |
| 10,046,819 B1 * | 8/2018 | Sellner | B62D 57/02 |
| 2003/0038607 A1 * | 2/2003 | Yim | A63H 33/042 318/568.11 |
| 2003/0092964 A1 * | 5/2003 | Kim | A61B 1/00016 600/101 |
| 2003/0137268 A1 * | 7/2003 | Papanikolopoulos | B62D 57/02 318/568.11 |
| 2008/0143065 A1 * | 6/2008 | Defazio | B62D 57/024 280/5.28 |
| 2009/0099709 A1 * | 4/2009 | Troy | B62D 57/00 701/1 |
| 2010/0032224 A1 * | 2/2010 | Liu | B25J 5/007 180/218 |
| 2010/0152922 A1 * | 6/2010 | Carlson | B62D 57/02 701/2 |
| 2010/0318059 A1 * | 12/2010 | Farritor | A61B 1/00156 604/500 |
| 2011/0308873 A1 * | 12/2011 | Kim | B60K 1/04 180/218 |
| 2012/0059520 A1 * | 3/2012 | Kossett | B60B 1/042 700/264 |
| 2012/0185087 A1 * | 7/2012 | Kang | B62D 57/024 700/245 |
| 2012/0273284 A1 * | 11/2012 | Nesnas | B25J 5/007 180/7.5 |
| 2015/0175202 A1 * | 6/2015 | MacGregor | G05D 1/0011 701/2 |
| 2017/0259811 A1 * | 9/2017 | Coulter | A61G 5/061 |
| 2018/0071909 A1 * | 3/2018 | Bewley | B25J 5/005 |
| 2018/0105215 A1 * | 4/2018 | Schnapp | B62D 37/04 |

* cited by examiner

THROWABLE ROBOT WITH CLAMSHELL BODY

CROSS-REFERENCE TO RELATED APPLICATIONS

The present application claims the benefit of U.S. patent application Ser. No. 14/747,817, filed Jun. 23, 2015, now U.S. Pat. No. 10,046,819, issued Aug. 14, 2018, which claims priority to U.S. Provisional Application No. 62/015,889, filed Jun. 23, 2014, said patent and the applications are incorporated herein in their entirety by reference.

BACKGROUND OF THE INVENTION

Throwable robots for use in military and police operations need to be highly durable and robust to reliably perform under difficult conditions. Ideally such robots can absorb substantial falls, and other shock conditions, moisture, and other contaminants. Any incremental improvements in reliability and performance for robots used in high stakes military and police operations are desirable.

Known two wheeled throwable robots are disclosed, for example, in U.S. D637217, Publication U.S. 20100152922, the contents of which are incorporated by reference herein. Conventionally tubular bodies are utilized for the chassis of the robots.

SUMMARY OF THE INVENTION

A two wheeled throwable robot comprises an elongate chassis with two ends, a motor at each end, drive wheels connected to the motors, and a tail extending from the elongate chassis. The chassis split length wise and comprised of a pair of elongate portions, a rear portion and a forward portion. The rear portion having recesses and brackets for containing and securing the pair of motors, recesses defined at each end including at the motors for receiving a pair of batteries. Adjoining respective surfaces join with a gasket or sealing material therebetween.

The chassis is generally cylindrical with modified surfaces and is split, looking at an end, in a vertical chord forward of the axis of the modified cylinder. This provides a clamshell part with deeper recesses for the motors and batteries, the high volume components, and a shallow clamshell part that retains the main printed circuit board. A feature and advantage of the layout is the vulnerable PCB is secured in a shallow component that has a high degree of structural strength with a central region projecting forward and flattened forward facing end portions.

Moreover the rearward deeper clamshell part has two openings for the wheel shafts entirely contained within the ends of the deeper clamshell. Additionally, in embodiments, an annular bushing, unitary with the deeper clamshell part, is entirely included and extends towards and cooperatively engages the forward shallow clamshell part in recess. A feature and advantage of this structure is that it provides enhanced sheer resistance at the clamshell juncture whilst providing enhanced wheel shaft support.

A feature and advantage of embodiments is that even with the small size, modularity allowing, for example, different motors and different radios, has been built in.

A features and advantage of embodiments of the invention over known art throwable robots is that the assembly has a reduced mechanical part count resulting in reduced manufacturing costs.

A features and advantage of embodiments of the invention over known art throwable robots is increased internal volume for battery and motors with essentially the same size body as prior art robots.

A feature and advantage of embodiments of the invention over known throwable robots is greatly reduced number of interfaces to seal and sealing surfaces that are easier to seal. The design is believed to meet IP67 standard overall.

A feature and advantage of embodiments of the invention over known throwable robots is integration of the blister elements reduces the effective diameter which can decrease the likelihood of direct impact with the outer surface.

A feature and advantage of embodiments of the invention over known throwable robots is a novel motor mounting system which can accommodate more motors, and is more reliable.

A features and advantage of embodiments of the invention over known art throwable robots is a novel antenna mounting system which is waterproof and easily reconfigurable. Moreover, an embodiment formed of Nitinol is highly robust and returns to its original orientation.

A feature and advantage of embodiments of the invention over known throwable robots is support for conformal antennas is also in place.

A feature and advantage of embodiments of the invention over known throwable robots is that the chassis provides for modular radio support—the chassis readily receives and supports industry standard radios, enabling the robot to have digital, spread-spectrum, frequency hopping, encrypted and mesh radio communication. Also enables multiple data streams that can be turned on and off remotely. Further enables activation and deactivation of functionality (e.g., IR LEDs)

A feature and advantage of embodiments of the invention over known throwable robots is an integrated digital video—can be processed onboard, video overlays can be added A feature and advantage of embodiments of the invention over known throwable robots is an elimination of vignetting—Previous robots could have vignetting in the image caused by alignment of the image sensor within the camera and the hole in the protective shell. By integrating the lens into the clamshell, this problem has been eliminated.

A feature and advantage of embodiments of the invention over known throwable robots is a significantly increased processing power (can now process video onboard, potential for increased autonomy).

A feature and advantage of embodiments of the invention over known throwable robots that contributes to the modularity, is that all major components connect through board to board connectors. With the exception of coaxial cables to the antennas and the wires on the leads of the motors and the charge plug, all wire harnesses have been eliminated. There is no longer any soldering required in final assembly (only on PCB population).

DETAILED DESCRIPTION

Figure 1:
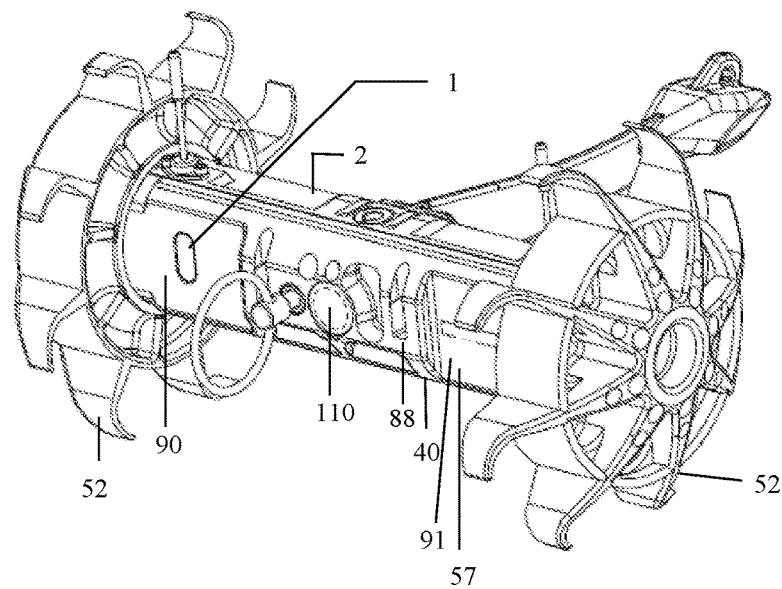
FIG. 1 is a front perspective view of a throwable robot according to the inventions herein.
Figure 2:
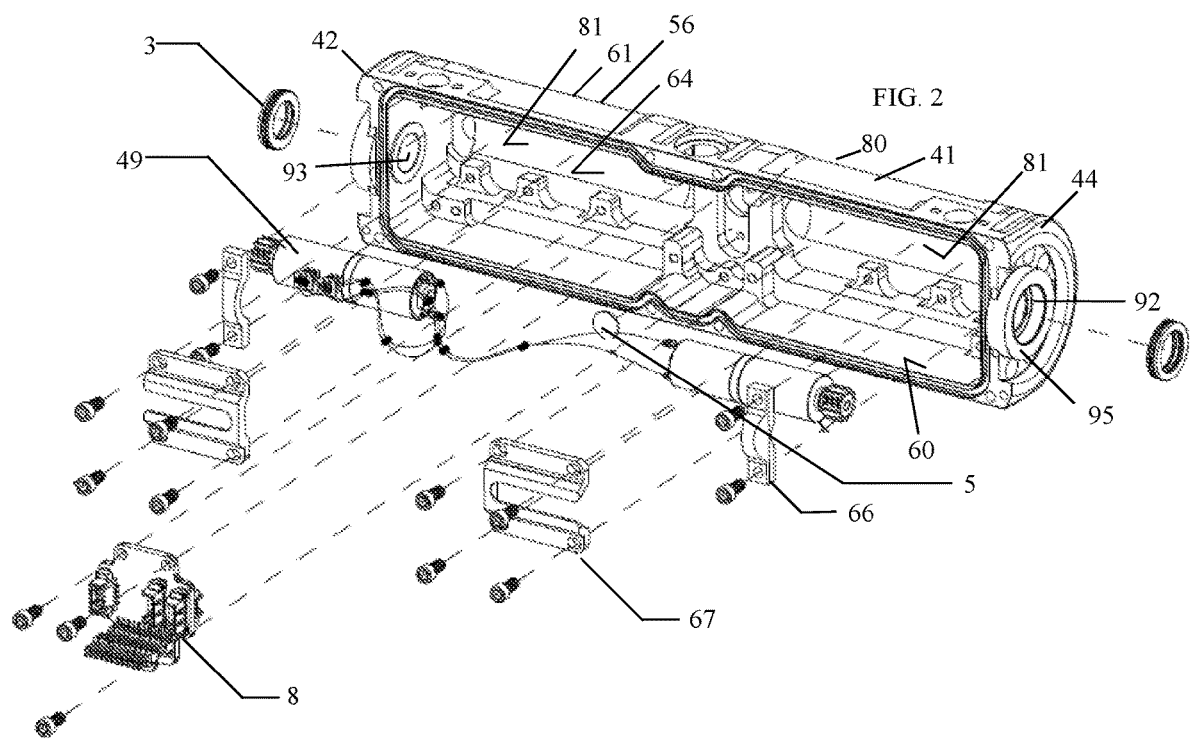
FIG. 2 is an exploded view of the rearward clamshell part illustrating motors and brackets.
Figure 3:
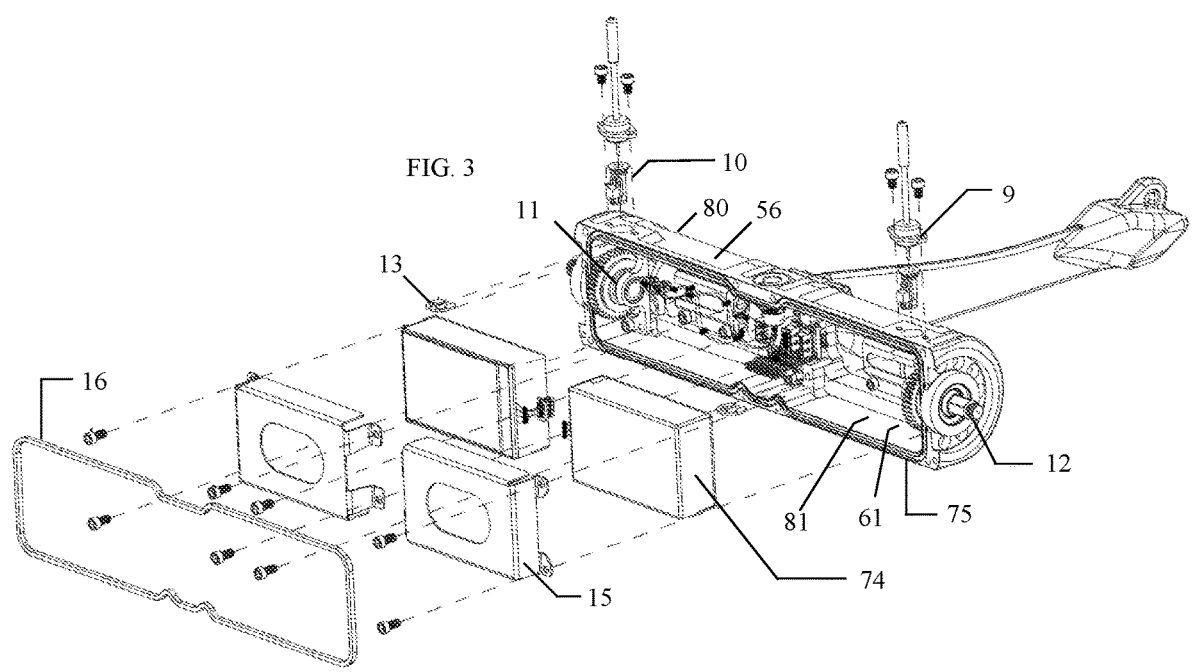
FIG. 3 is an exploded view of the rearward clamshell part illustrating the batteries and brackets.
Figure 4:
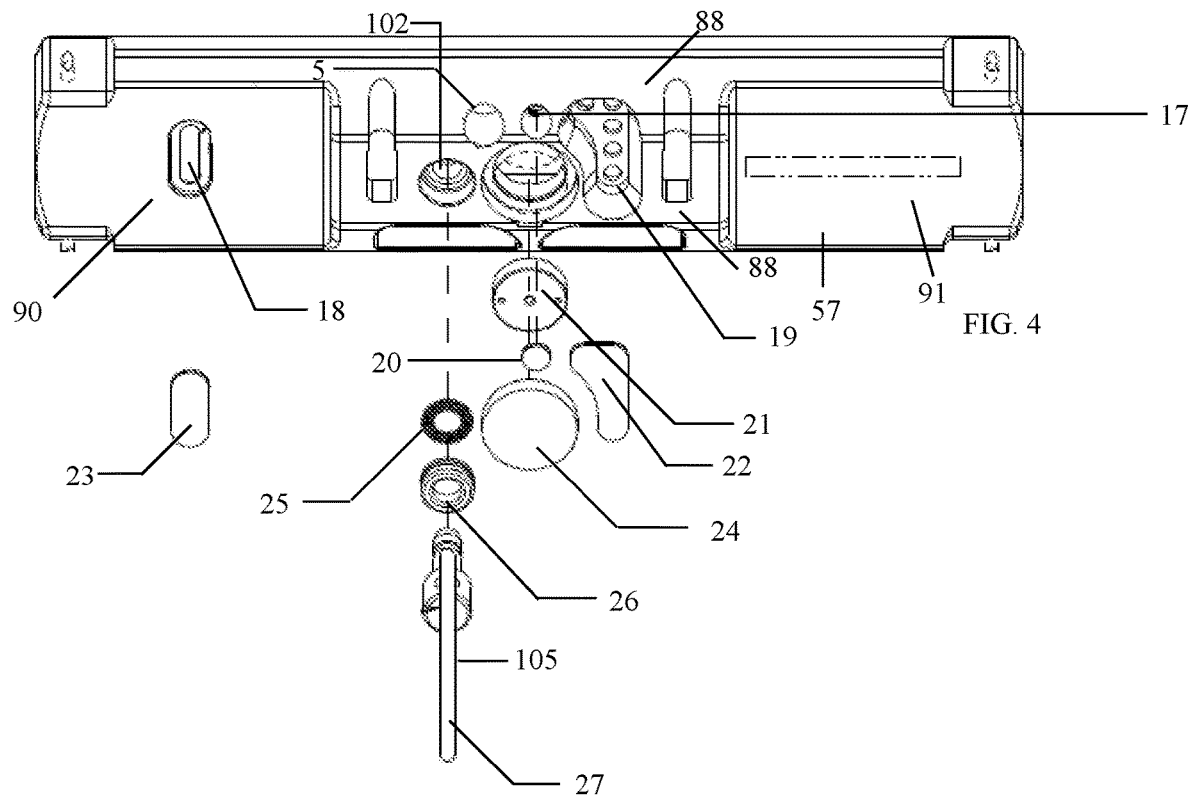
FIG. 4 is an exploded view of the forward clamshell part.
Figure 5:
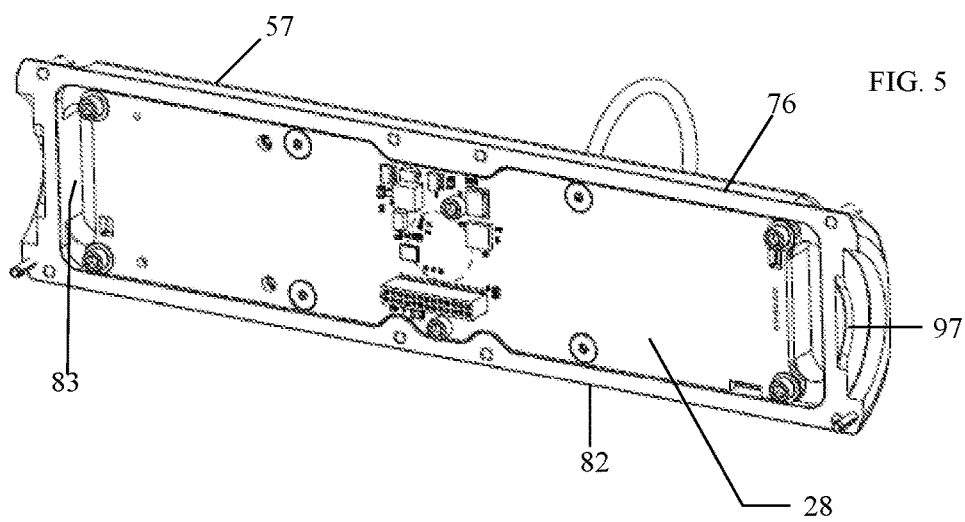
FIG. 5 is an elevational view of the forward clamshell part with a printed circuit board therein.
Figure 6:
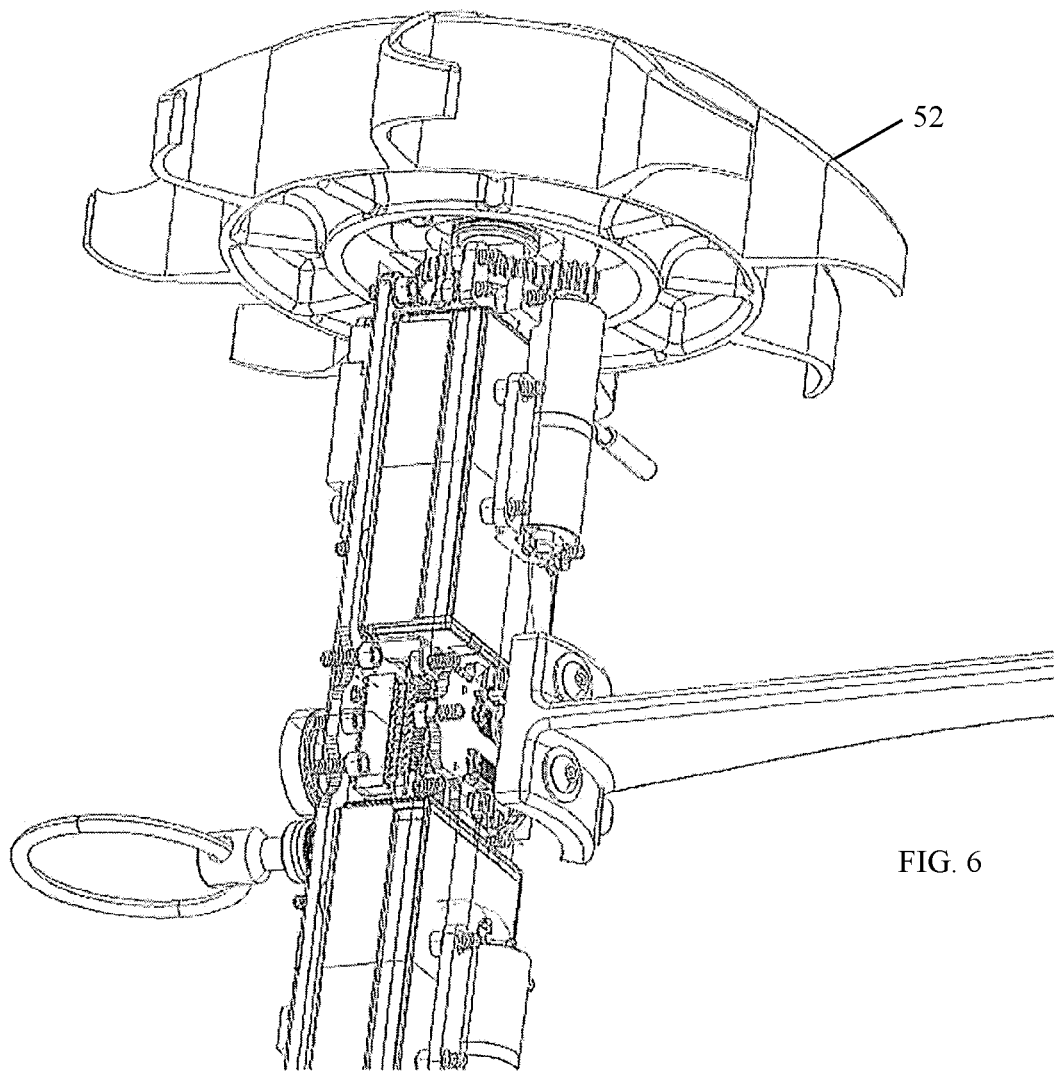
FIG. 6 is a partial plan view of the robot of FIG. 1 with the chassis removed illustrating the arrangement of the components.
Figure 7:
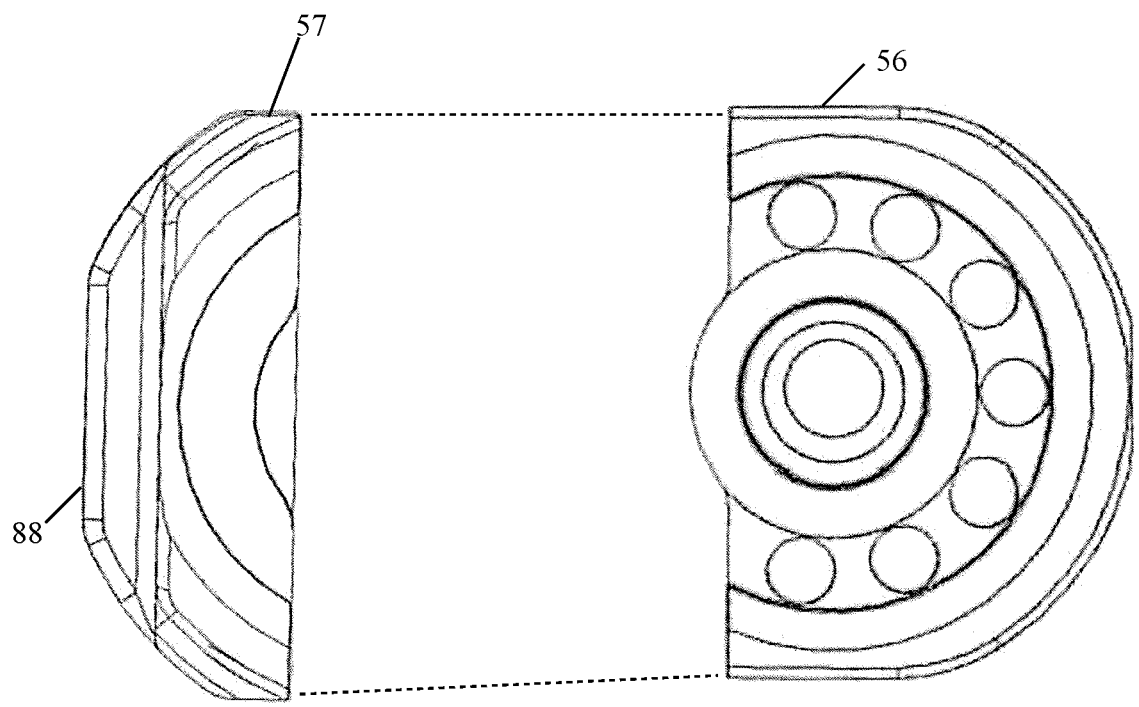
FIG. 7 is an end view of the chassis clamshell parts.
Figure 8:
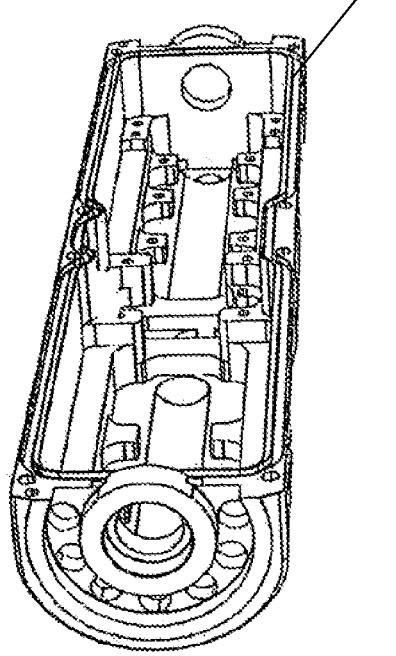
FIG. 8 is a perspective view of the deeper recess clamshell part without components.
Figure 9:
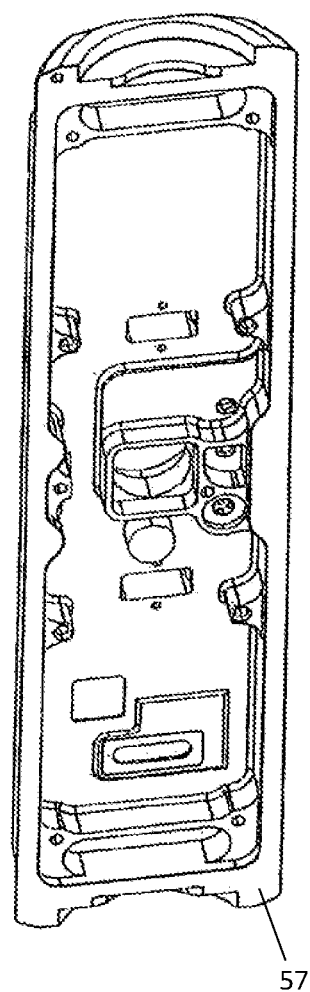
FIG. 9 is a perspective view of the shallow recess clamshell part without components.

A two wheeled throwable robot comprises an elongate chassis 40 with two ends 42, 44 and with exteriorly exposed surface 41, a motor 49 at each end, drive wheels 52 connected to the motors, and a tail extending from the elongate chassis. The chassis split length wise and comprised of a pair of elongate portions, a rearward portion 56 and a forward portion 57. The rearward portion having a C-shape cross section with exteriorly exposed flattened portions 60, 61. The rearward portion having recesses 64 and brackets 66, 67 for containing and securing the pair of motors 49, recesses defined at each end including at the motors for receiving a pair of batteries 74. Adjoining respective surfaces 75, 76 join with a gasket or sealing material therebetween.

The chassis is generally cylindrical with modified surfaces and is split, looking at an end, in a vertical chord forward of the axis of the modified cylinder. This provides a clamshell part 80 with deeper recesses 81 for the motors and batteries, the high volume components, and a shallow clamshell part 82 with a shallow recess 83 that retains the main printed circuit board 28. A feature and advantage of the layout is the vulnerable PCB 28 is secured in the forward portion 57, a shallow component that has a high degree of structural strength with a central region 88 projecting forward and flattened forward facing end portions 90, 91.

Moreover the rearward deeper clamshell part has two openings 92, 93 for the wheel shafts entirely contained within the ends of the deeper clamshell. Additionally, in embodiments, an annular bushing 95, unitary with the deeper clamshell part, is entirely included and extends towards and cooperatively engages the forward shallow clamshell part in a recess 97. A feature and advantage of this structure is that it provides enhanced sheer resistance at the clamshell juncture whilst providing enhanced wheel shaft support.

The robot described here is one incorporating video, audio, and light sensing with improved environmental sealing. The two-piece unitary chassis with a protective shell and blister have been replaced with a clamshell design. This reduces the number of interfaces to seal from 38 down to 12. The microphone, light sensor, LED illuminators 19, and blind hole 102 for the activation pin 105 from the prior art robot blister have been moved to the front half of the clamshell design while the charge port has been located in the rear half of the clamshell. The microphone port is sealed with an acoustic waterproof vent, rated to IP67, provided by W. L. Gore. The charging jack is IP67 rated unmated and has additional circuitry which will prevent the battery from short-circuiting across the charge jack terminals, which may happen, for example, if it is exposed to saltwater. This circuitry is deactivated when the robot is off because the battery's circuitry itself will ensure the battery is protected. The illumination LEDs, 19 light sensor, and e-ink display are covered with windows with clear VHB double-sided tape. The clamshell halves are held together by screws with an elastomeric gasket 16 in between the two halves for sealing.

By switching to the clamshell design, increased volume has been made available without a significant increase in size. Accommodations have been made to support two battery packs to support increase power draw of new electronics and increase runtimes. In addition, the motors now mount directly to the rear of the clamshell. This provides heatsinking and additional volume has been left to accommodate other models of motors (brushed with increased torque, brushless motors, etc.). The motor clamping has been revamped with a two piece hold down which is an improvement over the prior art throwable robots, which was cantilevered, resulting in high bending stress on the screws and a relatively unreliable clamp.

There is a micro-clutch assembly 12 built onto the axle. End caps have been eliminated and integrated into the main clamshell housing. Like before, spring-energized seals from Bal-Seal are employed for the shafts. Combined, this reduces part count and potential water and dust ingress. The shape of the shafts have been modified now to ensure the shaft seal only contacts smooth edges during the installation of the clutch assembly.

The electronics have been reconfigured to fit on a single primary board assembly (PCB). This primary board has an integrated camera 110, microcontrollers, microphones, photovoltaic light sensor 17 (used to determine when to activate LEDs), LEDs, hall-effect sensor (for activation via magnet embedded into the actuation pin 105), an industry standard modular radio interface connector, battery management, processing interface (presently an interface to a system on a module (SOM) that mounts as a daughter board), a breakout the "interface board"—a 2nd daughter board (which provides interfaces for the charge receptacle, brushed and brushless motors, and the dual battery configuration), gyroscopes, accelerometers, magnetometers, an e-ink display, and battery management system. This board also provides filter circuitry to selectively reduce motor noise which can be selectively enabled or disabled based on the robots motion.

Due to the camera sensor being directly integrated into the main PCB, the lens for the camera has been integrated into the front half of the clamshell. This lens is sealed in to prevent ingress of water or dust. A protective sticker can be used to protect against scratching. Previously the antennas were whip antennas made from braided steel cables coated in plastic. The whip design is critical to get the signal away from ground effects, but still possible to deform upon impact. Two antennas mounting points have been developed. The first is front-mounted and provides increased ease of assembly. The second is top mounted and provides for increased height and eliminates a portion of the robot from blocking the antenna signal and introducing directionality. In both cases, there is support for diversity or MIMO communication through the use of multiple antennas. Two antenna designs were considered. The first is a conformal antenna that wraps around the front portion of the body. The second is a whip made of a special blend of Nitinol, a shape memory alloy. Superior range has been achieved with the Nitinol whips. The properties of Nitinol are appealing as they can deform on impact and then return upright when the robot self-rights where previous whip antennas would drag on the ground and cause variability in range. Previous antennas were crimped onto a threaded fastener which were then screwed into place. Adhesives were then applied to prevent moisture ingress. The new antennas utilize a cartridge approach which has a small PCB th matching circuitry and a pin receptacle mounted on a cartridge that is inserted from the top of the robot and held in place with an e-ring. A pin is crimped onto the Nitinol braid and a cap is fit around an insulator that is fit around the antenna. Silicone is used to seal the top of the cap. These antennas can be replaced in the field by removing two external screws and sliding an antenna out. A feature and advantage of embodiments of the invention over known throwable robots that contributes to the modularity, is that all major components connect through board to board connectors. A feature and advantage of embodiments of the invention over known throwable robots that contributes to the modularity, is that all major components connect through board to board connectors.

In embodiments the robot wheels are less than 6 inches in diameter. In embodiments, less than 5 inches. In embodiments, less than 4 inches. In embodiments, the robot weighs less than 5 pounds. The features of the robot of Publication U.S. 20100152922 may be incorporated in the robot claimed and described herein. Said reference is incorporated by reference herein.

We claim:

1. A two wheeled throwable robot comprising: an elongate two-piece chassis having an outwardly exposed surface extending around the chassis and one of the two piece chassis comprising a unitary deep recess portion, a unitary second portion, and a gasket or sealing material disposed therebetween, the deep recess portion having a pair of opposite ends each with an opening for a wheel shaft, the respective wheel shaft openings entirely contained within each respective end, the unitary deep recess portion having a C-shaped cross-section inwardly from the pair of ends, the unitary second portion having a pair of ends and being configured for sealing attachment onto the deep recess portion defining a chassis interior, a pair of drive motors positioned and secured in place in the deep recess portion, a battery secured in the deep recess portion; a printed circuit board secured in the chassis; a pair of wheels attached to each end of the deep recess portion of the chassis, each of the pair of wheels being driven by one of the pair of drive motors; and a tail extending from a rearward face of the elongate chassis,
wherein the pair of ends of the deep recess portion are each configured as an annular bushing.

2. The two wheeled throwable robot of claim 1 wherein the circuit board is secured to the forwardly positioned unitary second portion of the chassis and has a camera attached thereto, the camera positioned at an opening in the forwardly positioned portion of the chassis.

3. The two wheeled throwable robot of claim 2 wherein the chassis has a camera lens secured to the chassis at the opening.

4. The two wheeled throwable robot of claim 1 wherein the printed circuit board has a microphone, a camera, and illumination LED's attached thereto, and positioned at a forward face of the chassis.

5. The two wheeled throwable robot of claim 1 wherein each of the wheels is less than 6 inches in diameter and the robot weighs less than 5 pounds.

6. The two wheeled throwable robot of claim 5 wherein each wheel has a shaft extending through the respective wheel shaft openings in the deep recess portion, each shaft sealed with a shaft seal.

7. The two wheeled throwable robot of claim 6 wherein the camera is integrated into the circuit board, the unitary second portion is positioned forwardly of the deep recess portion, and the circuit board spans a recess portion of the unitary second portion.

8. The two wheeled throwable robot of claim 7 wherein a light sensor, and a plurality of illumination LED's are attached to the printed circuit board.

9. A two wheeled throwable robot comprising:
an elongate body supporting a pair of drive wheels, one drive wheel on each of two ends of the body, a tail centrally positioned on the elongate body intermediate the pair of drive wheels and extending rearwardly from the body;
the elongate body comprising an elongate chassis generally cylindrical and is split, in an end view, in a vertical chord forward of an axis of the chassis, the chassis comprising a unitary elongate deep recess chassis portion and an unitary elongate shallow recess chassis portion, the deep recess chassis portion and shallow recess chassis portion assembled together defining a chassis interior and providing an exteriorly exposed chassis surface, the deep recess chassis portion having a pair of ends and having a C-shape cross section inwardly of the ends, a motor positioned and secured in the deep recess chassis portion; a battery positioned and secured in the deep recess chassis portion; a printed circuit board with control circuitry secured within the chassis in the interior; the pair of drive wheels attached at each end of the deep recess chassis portion, each of the pair of wheels being motor driven.

10. The two wheeled throwable robot of claim 9 wherein the printed circuit board has a camera attached thereto and positioned at an opening in a forward portion of the chassis, the opening having a lens secured thereto.

11. The two wheeled throwable robot of claim 9 wherein the forward portion of the chassis is the shallow recess chassis portion.

12. The two wheeled throwable robot of claim 11 wherein the printed circuit board has a microphone and a photovoltaic sensor attached thereto end and each positioned at openings in the forward portion of the chassis.

13. The two wheeled throwable robot of claim 11 wherein each of the pair of wheels is less than 6 inches in diameter.

14. The two wheeled throwable robot of claim 9 wherein the robot weighs less than 5 pounds.

15. The two wheeled throwable robot of claim 9 wherein the robot has two motors and each motor is connected to one of the pair of drive wheels.

16. The two wheeled throwable robot of claim 9 wherein the chassis has flattened portions on a top side and bottom side of the chassis.

17. The two wheeled throwable robot of claim 9 wherein an actuation member for actuating the robot is positioned at a forward face of the chassis.

18. The two wheeled throwable robot of claim 9 wherein the pair of ends of the deep recess chassis portion each have an opening for a wheel shaft, the respective wheel shaft openings entirely contained within each respective end.

19. A two wheeled throwable robot comprising:
an elongate body supporting a pair of drive wheels, one drive wheel on each of two ends of the body, a tail centrally positioned on the elongate body intermediate the pair of drive wheels and extending rearwardly from the body;
the elongate body comprising an elongate chassis comprising a clam shell shape with an elongate deep recess chassis portion and an elongate shallow recess chassis portion, the deep recess chassis portion and shallow recess chassis portion assembled together defining a chassis interior and providing an exteriorly exposed chassis surface, the deep recess chassis portion having a pair of ends and having a C-shape cross section inwardly of the ends, a motor positioned and secured in the deep recess chassis portion; a battery positioned and secured in the deep recess chassis portion; a printed circuit board with control circuitry secured within the chassis in the interior; the pair of drive wheels attached at each end of the deep recess chassis portion, each of the pair of wheels being motor driven, wherein the shallow recess chassis portion is forwardly positioned and has a central region projecting forwardly and further having flattened forward facing end portions on each lateral side of the central region.

* * * * *